United States Patent [19]

Tohda et al.

[11] 4,303,913
[45] Dec. 1, 1981

[54] FLUORESCENT DISPLAY DEVICE AND DISPLAY APPARATUS USING THE SAME

[75] Inventors: Takao Tohda, Ikoma; Tsuneharu Nitta, Katano; Yoji Fukuda; Tomizo Matsuoka, both of Neyagawa; Ziro Terada, Katano, all of Japan

[73] Assignee: Matsushita Electric Industrial Co., Ltd., Osaka, Japan

[21] Appl. No.: 63,701

[22] Filed: Aug. 6, 1979

[30] Foreign Application Priority Data

Aug. 25, 1978 [JP] Japan ............................. 53-104035
Aug. 25, 1978 [JP] Japan ............................. 53-104036
Aug. 25, 1978 [JP] Japan ............................. 53-104041

[51] Int. Cl.³ .............................................. G06F 3/14
[52] U.S. Cl. ................................... 340/704; 340/774; 313/467; 313/497; 252/301.4 F
[58] Field of Search ............... 340/704, 774; 313/467, 313/496, 497; 252/301.4 F

[56] References Cited

U.S. PATENT DOCUMENTS

| | | | |
|---|---|---|---|
| 3,634,850 | 1/1972 | Miyasaka | 340/774 |
| 4,081,398 | 3/1978 | Hase et al. | 313/496 |
| 4,103,069 | 7/1978 | Schulze et al. | 313/467 |
| 4,155,030 | 5/1979 | Chang | 340/704 |
| 4,162,422 | 7/1979 | Morimoto et al. | 313/496 |

FOREIGN PATENT DOCUMENTS 51-71285 6/1976 Japan ............................ 252/301.4 F

OTHER PUBLICATIONS

*Preparation and Low Energy Electron Excitation of SnO₂:Eu Powder Phosphor*, Matsooka et al., J. Electrochem. Soc., Jan. 1978, pp. 102-106.

*Primary Examiner*—Marshall M. Curtis
*Attorney, Agent, or Firm*—Stevens, Davis, Miller & Mosher

[57] ABSTRACT

A fluorescent display device comprising at least one phosphor screen composed of a mixture of a $SnO_2$:Eu phosphor with at least one of the cathodoluminescent phosphors having emission spectra and exitation properties different from $SnO_2$:Eu phosphor. This fluorescent display device emits light of different colors when driven at different voltages and at pulse voltages of different duty cycles. A display apparatus comprises such a fluorescent display device and a driving device with variable output voltage.

5 Claims, 8 Drawing Figures

FLUORESCENT DISPLAY DEVICE AND DISPLAY APPARATUS USING THE SAME

The present invention relates to fluorescent display devices and display apparatuses using the same, and more particularly the invention relates to fluorescent display devices and display apparatuses which are capable of emitting light of a plurality of different colors.

In the past, only the ZnO: Zn phosphor for emitting green light has been used as one which can be excited by low energy or velocity electrons (5 to 100 eV). The properties of this phosphor are such that it becomes luminous when excited by low energy electrons of about 5 eV and the resulting brightness increases substantially linearly as the electron acceleration voltage is increased. The persistence time of the phosphor is very short as compared with many other phosphors and it is said to be on the order of 0.1 $\mu$sec. The special characteristics of the ZnO : Zn phosphor have been utilized to extend its use into cathode ray tubes in which high energy or velocity electrons of 1 KeV–10 KeV are used to excite the phosphor to emit light.

Numerical indicator tubes operable by low energy electrons are known in the art in which an acceleration energy of 20 to 25 eV is applied to the electrons emitted from a hot cathode so that the electrons are directed to a ZnO : Zn phosphor and the phosphor is excited to emit light or alternatively the plasma electrons produced by a gas discharge are utilized to excite the ZnO : Zn phosphor to emit light.

Recently, it has become popular to combine a microcomputer with sensing devices to control a system. The range of uses of such an arrangement has been extended into not only such cooking appliances as microwave ovens and ordinary ovens, air conditioning apparatus including room air conditioners, etc., and such household appliances as washing machines and drying machines, but also into many different systems. A display system now constitutes one of the elements essential for such a system control.

The character display in such a case is necessary for the purpose of timer indications, level indications or various operation indications. In all cases of the character display by fluorescent indicator tubes, the character display has been effected merely by radiation of green light from ZnO : Zn phosphor. For example, where the fluorescent indicator tube is operated as a timer in a microwave oven, the tube is generally designed to perform the ordinary time and hour indication as well as the operating time indication for indicating the beginning and end of cooking. In such applications, if the former time indicator is made in a color different from that of the latter time indication, the indications would be understood very easily and the display system would be made a very characteristic one.

Also, with the recently available audio systems, compass level indication, tuning indication, etc., it is desirable to give multi-color indications in such a manner that as for example, the safe region and the dangerous region can be distinguished from each other according to their colors in the case of the former level indication and the distinction between AM and FM can be made according to their colors in the case of the latter tuning indication.

It would also be much convenient if the similar multi-color indication can be used in the indication of oil level, temperature, speed and travel distance of automobiles.

Despite this long felt need in these applications, no fluorescent indicator tube employing a phosphor which can be excited by means of low energy electrons has been realized. This is attributable to the fact that no phosphors which can be efficiently excited by means of low energy electrons to emit light in colors other than green are known in the art in addition to the ZnO : Zn phosphor. Also, the multi-color indication requires an increase in the number of electrodes and the number of lead terminals and tends to cause a deteriorated clarity and so on.

In addition to the fluorescent indicator tubes, other types of display devices such as light-emitting diode display devices and liquid crystal display devices have recently been developed and these display devices have the following serious disadvantages. If a dot indication method is used with the light-emitting diode display device, the dots themselves are large in size and consequently the display is rather difficult to read. On the other hand, the liquid crystal display device has limitations to use conditions since such liquid crystal does not have self-emission mechanism. In the fluorescent indicator tube, however, a paste of finely powdered phosphor material is applied by a printing process and therefore any characters, numbers, lines, picture elements or the like can be arranged as desired and clearly. Thus, its display is very easy to see and the fluorescent indicator tube provides an excellent display system.

In view of the foregoing background, the present inventors have made investigations with respect to the development of phosphor which could be excited by means of low energy electrons to emit light with a high efficiency and simple method of multi-color luminescence with a view to realizing a multi-color display system with a fluorescent display device. As a result, the inventors have developed a new and novel low energy electron phosphor which can be excited by means of low energy electrons to emit orange-red light which attains the maximum luminescent peak at a wave length of about 590 nm. It has been found that $SnO_2$ : Eu phosphor emits light at a voltage of 5 V as in the case of ZnO : Zn phosphor, and its luminous efficiency is as high as 5 to 7%. It has also been discovered that in addition to the emission of orange-red light which is best suited for the purpose of color discrimination with the green light emitted by the ZnO : Zn phosphor, the emission of light from the $SnO_2$ : Eu phosphor has a sublinear voltage-dependent characteristic, while the characteristic of the ZnO : Zn phosphor is superlinear, and its persistence time is more than about 400 times that of the ZnO : Zn phosphor.

Attempts have recently been made to add a small amount of conductive ZnO or $In_2O_3$ to the conventionally used high energy electron operating phosphors so as to produce low energy electron operating phosphors which would emit light when excited by low energy electrons. The phosphors of this type which have heretofore been reported include, for example, $Zn_2SiO_4$ : Mn (green), ZnS : Mn (yellow), ZnS : Ag (blue), (ZnCd)S : Ag (red), ZnS : Cu (green), $Y_2O_2S$ : Eu (red), $MgGa_2O_4$ : Mn and $ZnGa_2O_4$ : Mn (green). These phosphors are low in luminous efficiency as compared with the ZnO : Zn and $SnO_2$ : Eu phosphors and are also different in emission starting voltage, emission voltage-dependence and emission spectrum from the latter phosphors.

The present invention was achieved as the result of the investigation of the emission characteristics of mainly the conventionally used ZnO : Zn phosphor and the newly developed $SnO_2$ : Eu phosphor.

More specifically, in accordance with the invention there is provided a novel low energy electron operating type fluorescent display device, and display apparatus in which the phosphor screen is formed with a mixture of $SnO_2$ : Eu phosphor and at least one of plural kinds of phosphor materials having different emission spectra and excitation properties from the $SnO_2$ : Eu phosphor, whereby overcoming the previously mentioned deficiencies which one encounters among the prior art fluorescent display devices.

The plurality of phosphor materials are suitable for use with a multi-color fluorescent display device, that emit light at different emission wavelengths and necessarily include $SnO_2$ : Eu phosphor having a sublinear voltage-dependent emission characteristic and at least one material selected from the group consisting of ZnO : Zn, $Zn_2SiO_4$ : Mn, ZnS : Mn, ZnS : Cu, ZnS : Ag, (ZnCd)S : Ag, $ZnGa_2O_4$ : Mn, $MgGa_2O_4$ : Mn and $Y_2O_2S$ : Eu phosphors.

In accordance with the teaching of the invention, attention is drawn to the fact that the emission brightness of ZnO : Zn, $Zn_2SiO_4$ : Mn, (ZnCd)S and ZnS phosphors increase with an increase in the applied voltage, and the $SnO_2$ : Eu phosphor has a sublinear characteristic. The fluorescent display device according to the invention positively makes use of the differences in emission properties among these phosphors.

Thus, the fluorescent display device according to the invention has a number of advantages which may be summarized as follows.

(1) Multi-color display and color variations can be easily accomplished and intermediate colors can also be produced.

(2) Due to the fact that a phosphor mixture is applied to the same electrode to form a phosphor screen, the disadvantages due to the separate application of different phosphores, such as the increased number of terminals, etc., can be overcome.

(3) The display device can be manufactured very easily and there is no need to change the conventional manufacturing process.

(4) The display needs not particularly be presented in the form of dot display and therefore the display is easy to perceive and understand.

(5) An increased amount of information can be displayed.

(6) Not only the letter display but also the character display and graphic display in colors can be made clearly.

For a better understanding of the invention reference is made to the following detailed description taken in conjunction with the accompanying drawings, in which.

The principle and an embodiment of a fluorescent display device according to the invention will now be described with reference to the accompanying drawings.

Figure 1:
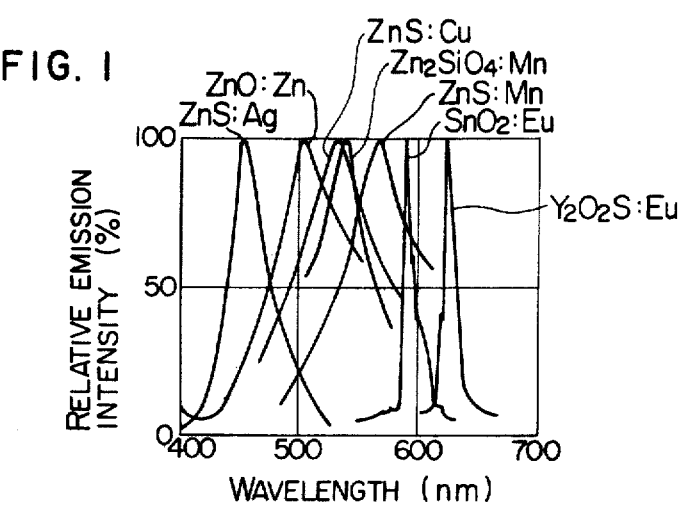
FIG. 1 is a graph showing the emission spectra of typical phosphors which can be excited by low energy electrons.
Figure 2:
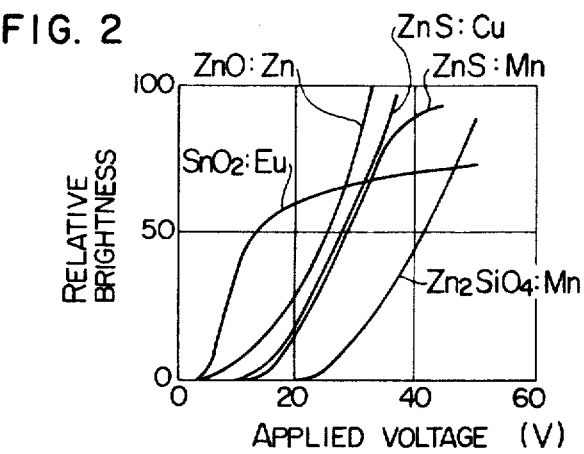
FIG. 2 shows by way of example the voltage-dependent brightness of some of the phosphors in FIG. 1.

With reference to FIG. 1, there are shown the emission spectra of typical cathodoluminescent phosphors having different emission wavelengths. FIG. 2 shows, as an exemplary characteristic constituting the basic principle of the invention, the voltage-dependence of the light emitted from each of the typical phosphors. As will be seen from FIG. 2. The emission of light from the $SnO_2$ phosphor has a sublinear voltage-dependent characteristic, although the characteristics of the ZnO : Zn, ZnS : Cu, ZnS : Mn and $Zn_2SiO_4$ : Mn phosphors are superlinear.

The phosphor screen is formed with a mixture of a plurality of phosphors having different emission characteristics as shown in FIGS. 1, 2 and the phosphor screen emits light when hit by an electron beam. In this case, the characteristics shown in FIG. 2, for example, may be utilized so as to vary the applied voltage between the anode and the cathode and thereby to produce light of different colors. Also, the voltage may be applied intermittently with different pulse widths and hence different duty cycles so as to produce light of different colors. In this case, the variation of a current density on the phosphor screen may cause the variation of the emission color.

Figure 3A:
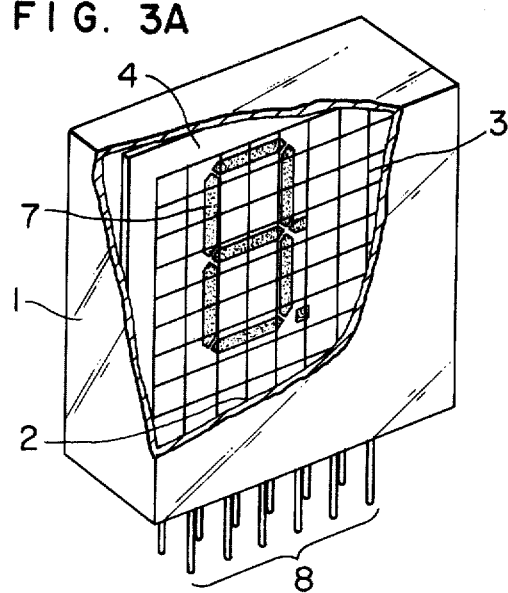
FIGS. 3A to 3C show the construction of an embodiment of a fluorescent display device according to the invention, with FIG. 3A showing a partially cutaway view of the device, FIG. 3B showing a sectional view of the device and FIG. 3C showing a sectional view of the character display electrode assembly of the device.
Figure 3B:
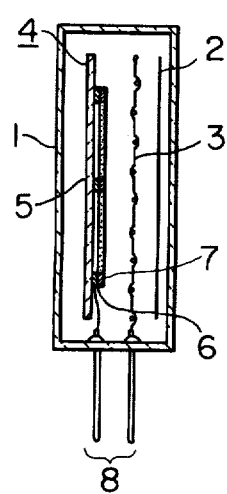

FIG. 3A is a partially cutaway view of an embodiment of the fluorescent display device according to the invention and FIG. 3B is a sectional view of the embodiment.

In the Figures, numeral 1 designates a transparent glass enclosure, and arrnaged inside the enclosure 1 side by side successively from the frontmost part toward the rear part thereof are a filament-type cathode 2 capable of emitting thermions, a mesh type accelerating electrode 3 and a character display electrode assembly 4. The character display electrode assembly 4 comprises a glass supporting base 5, an anode 6 formed on the front surface of the base 5 and consisting for example of 9 character segments and a phosphor screen 7 formed on the anode 6. Numeral 8 designates lead wires for electrically bringing the electrodes 2, 3 and 4 to the outside of the glass enclosure 1.

This fluorescent display device is basically identical in construction with the prior art devices.

The phosphor screen 7 is formed by coating the anode 6 with a mixture of a plurality of phosphors having different emission wavelengths and excitation properties. For example, it is possible to advantageously use a mixture of $SnO_2$ : Eu phosphor and at least one phosphor selected from the group including ZnO : Zn, $Zn_2SiO_4$ : Mn, ZnS : Mn, ZnS : Cu, ZnS : Ag, (ZnCd)S : Ag, $ZnGa_2O_4$ : Mn, $MgGa_2O_4$ : Mn and $Y_2O_2S$ : Eu phosphors. The proportions of phosphors in a mixture vary depending on the size and specific surface area of the phosphor particles and the invention is not intended to be limited to any specified proportions.

Figure 3C:
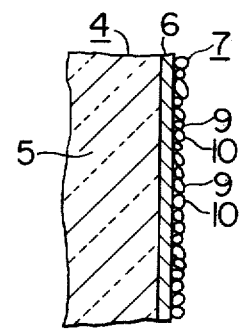

In FIG. 3C showing an exemplary construction of the character display electrode assembly 4, particles 9 and 10 of the phosphors, e.g., ZnO : Zn and $SnO_2$ : Eu, respectively, are fixedly deposited on the anode 6.

Next, the display operation of the above described fluorescent display device will be described briefly.

The cathode 2 is energized to be maintained in a condition capable of emitting thermions and the same voltage is applied to the accelerating electrode 3 and the anode 6. In this condition, by selectively applying a voltage to the electrode 6 in accordance with a character signal, it is possible to display the corresponding character. In this case, the luminescent color of the phosphor screen 7 can be varied by varying the applied voltage. For example, when the phosphor screen 7 was formed with a mixed phosphor material comprising 95 parts by weight of $SnO_2$ : Eu and 5 parts by weight of ZnO : Zn and a voltage of 10 V was applied between the electrodes 2 and 6, the emission of red like light was noticed as will be seen from FIG. 2. On the other hand, when a voltage of 30 V was applied between the electrodes 2 and 6, the emission of green like light was noticed. On the other hand, by applying a voltage in pulse waveform and changing its duty cycle, it was possible to vary the color of emitted light. When a mixture of phosphor material comprising 60 parts by weight of $SnO_2$ : EU and 40 parts by weight of $Zn_2SiO_4$ : Mn was used and a voltage of 10 was applied between the electrodes 2 and 6, the emission of red like light was noticed, whereas when the applied voltage was 50 V, the emission of green like light was noticed. With the other combination of the phosphor, the similar results were obtained.

While, in the embodiments described above, the electron source comprised a thermionic source, it is possible to use a plasma producing gas, such as helium, neon or argon and to seal the gas into the glass enclosure so that the gas is converted into a plasma and its electrons are used to excite the phoshpors.

A display apparatus according to the invention comprises a fluorescent display device of the above described type and a driving device for driving the fluorescent display device with a variable output voltage to display characters or the like in selected colors and its preferred embodiments will now be described with reference to the accompanying drawings.

Figure 4:
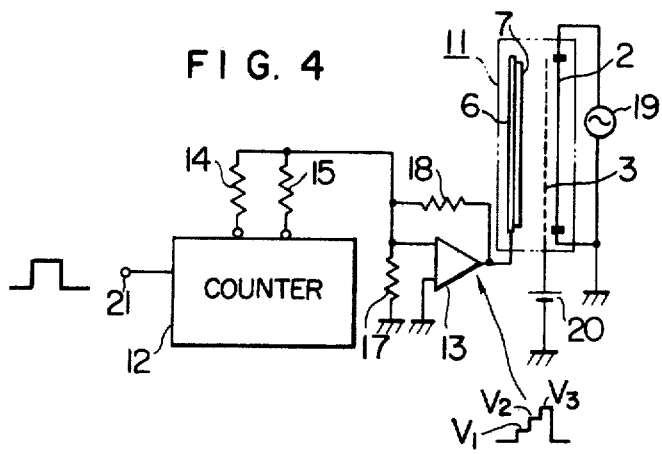
FIGS. 4, 5 and 6 show the construction of further embodiments of a display apparatus according to the invention.

FIG. 4 shows the construction of one embodiment. The Figure shows only the principal parts of a fluorescent display device 11. In this embodiment, a counter circuit 12 and an operational amplifier 13 constitute a driving device. The counter circuit 12 has its output terminals connected to resistors 14 and 15 whose other ends are connected to an input resistor 17 of the operational amplifier 13. Numeral 18 designates a feedback resistor of the operational amplifier 13. The output voltage of the operational amplifier 13 is applied between electrodes 2 and 6. Also, a heater current is supplied to the cathode electrode 2 from a power source 19 and an acceleration voltage is applied between the electrodes 2 and 3 from a power source 20.

With the apparatus constructed as described above, when input pulses are applied to an input terminal 21 of the counter circuit 12, the corresponding output appears at the output terminals of the counter circuit 12. If, for example, the counter circuit 12 comprises a binary counter and the resistance values of the resistors 14, 15, 17 and 18 are respectively selected 100 kΩ, 50 kΩ, 1 kΩ and 250 kΩ, an output voltage having a waveform stepped (staircase waveform) corresponding to the number of pulses applied to the counter circuit 12 is generated at the output terminal of the operation amplifier 13. Consequently, the driving voltage applied between the electrodes 2 and 6 of the fluorescent display device 11 is varied in a step-form manner and the color of the emitted light corresponds to the step level of the amplifier output voltage. It was found by experiments that the color of the emitted light corresponded to the number of pulses applied to the counter circuit 12.

Figure 5:
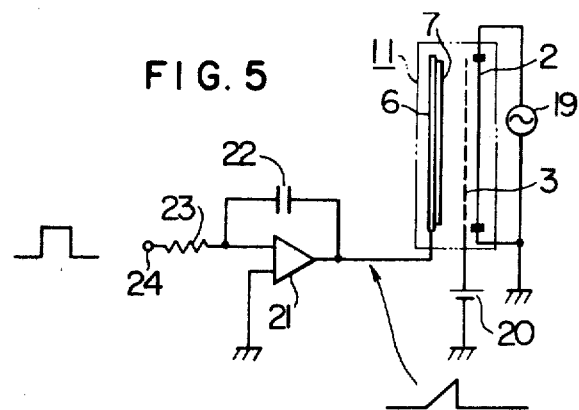

FIG. 5 shows the construction of another embodiment. This embodiment differs from the embodiment of FIG. 4 in that a driving voltage is applied between the electrodes 2 and 6 of the fluorescent display device 11 by an integrator comprising an operational amplifier 21 and a capacitor 22. In the Figure, numeral 23 designates an input resistor of the integrator, and 24 an integrator input terminal.

When an input signal is applied to the input terminal 24, an output proportional to the integral of the input signal is generated at the output terminal of the operational amplifier 21. When the resulting sawtooth or serrated driving voltage was applied between the electrodes 2 and 6 of the fluorescent display device 11, the color of the light emitted from the phosphor screen 7 was varied successively.

Figure 6:
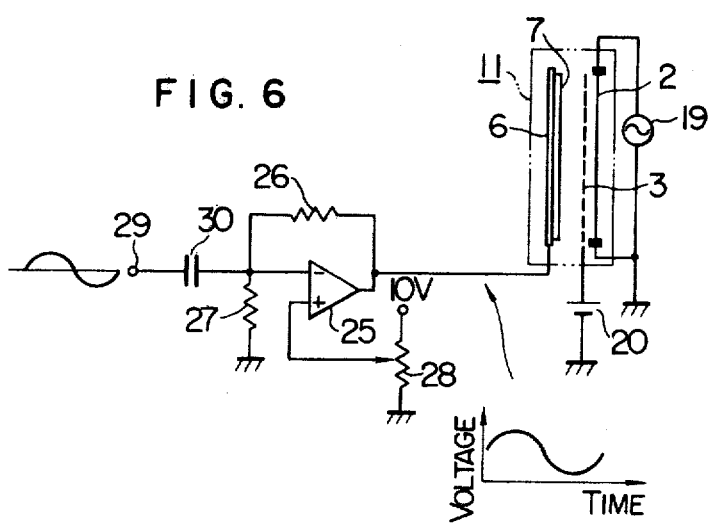

FIG. 6 shows the construction of still another embodiment. This embodiment differs from the embodiment of FIG. 4 in that a sinusoidal voltage is superposed on a DC component and the resulting voltage is applied to the fluorescent display device 11 to successively and periodically vary its luminescent color. In the Figure, numeral 25 designates an operational amplifier, 26 an amplifier feedback resistor, 27 an amplifier input resistor, 28 a variable resistor for changing the DC level, 29 an input terminal, and 30 a non-coupling capacitor.

When a sinusoidal wave voltage is applied to the input terminal 29, the operational amplifier 25 generates at its output terminal a driving voltage having the DC level set by the variable resistor 28 and including the sinusoidal alternating component. By applying such driving voltage between the electrodes 2 and 6 of the fluorescent display device 11, it was possible to successively and periodically vary the color of the light emitted from the phosphor screen 7.

It will thus be seen from the foregoing that in accordance with the invention a display apparatus comprises a fluorescent display device having a phosphor screen composed of a mixture of a $SnO_2$: Eu phosphor with at least one of the cathodoluminescent phosphors having different emission spectra and different excitation properties from the $SnO_2$: Eu phosphor and a driving circuit for driving the fluorescent display device with a variable output voltage, whereby the luminescent color of the fluorescent display device can be varied very easily in accordance with the characteristics of the driving voltage. By using the device, it is possible to provide diversified types of digital display and it is also possible to improve the display function of various apparatuses incorporating the device. It is self-evident that the present invention can be advantageously used for character display as well as graphic display purposes.

What we claim is:

1. A fluorescent display device emitting lights of different colors when excited by low energy electrons accelerated by different voltages, said device comprising at least one phosphor screen composed of a mixture of a $SnO_2$: Eu phosphor with at least one of the cathodoluminescent phosphors having different emission spectra and different excitation properties from $SnO_2$: Eu phosphor.

2. A flourescent display device emitting lights of different colors when excited by low energy electrons accelerated by pulse voltages of different duty cycles, said device comprising at least one phosphor screen composed of a mixture of a $SnO_2$: Eu phosphor with at least one of the cathodoluminescent phorphors having different emission spectra and different excitation properties from $SnO_2$: Eu phosphor.

3. A fluorescent display device according to claim 1 or claim 2 wherein the phosphor screen is composed of a mixture of a $SnO_2$: Eu phosphor with at least one of the phosphors selected from the group consisting of ZnO: Zn, $Zn_2SiO_4$: Mn, ZnS: Mn, ZnS: Cu, ZnS: Ag, $(Zn_1Cd)S$: Ag, $ZnGa_2O_4$: Mn, $MgGa_2O_4$: Mn, and $Y_2O_2S$: Eu.

4. A display apparatus comprising a fluorescent display device and a driving device with variable output voltage, said fluorescent display device comprising at least one phosphor screen composed of a mixture of a $SnO_2$: Eu phosphor with at least one of the cathodoluminescent phosphors having different emission spectra and different voltage-dependent exitation properties from $SnO_2$: Eu phosphor, the display apparatus further comprising control means for controlling the variable output voltage of the driving device to select emission color of the display device.

5. A display apparatus according to claim 4, wherein the driving device generates one of voltage signals having stepping, ramp and periodical sinusoidal waveforms.

* * * * *